United States Patent [19]

Credner

[11] 4,444,867
[45] Apr. 24, 1984

[54] PHOTOGRAPHIC RECORDING MATERIAL FOR DIFFUSION PROCESSES AND NEW NON-DIFFUSING SULFILIMINE COMPOUNDS SUITABLE FOR USE THEREIN

[75] Inventor: Hans-Heinrich Credner, Hohenschaeftlarn, Fed. Rep. of Germany

[73] Assignee: Agfa-Gevaert Aktiengesellschaft, Leverkusen, Fed. Rep. of Germany

[21] Appl. No.: 486,110

[22] Filed: Apr. 18, 1983

[30] Foreign Application Priority Data

Apr. 28, 1982 [DE] Fed. Rep. of Germany ....... 3215834

[51] Int. Cl.³ .................. G03C 1/40; G03C 5/54; G03C 1/10; G03C 1/48
[52] U.S. Cl. .................. 430/223; 430/219; 430/542; 430/543; 430/559; 430/562; 430/564; 430/566; 430/611
[58] Field of Search ............... 430/218, 223, 219, 543, 430/542, 559, 562, 564, 566, 611

[56] References Cited

U.S. PATENT DOCUMENTS 4,369,243  1/1983  Credner et al. .................. 430/562

Primary Examiner—Richard L. Schilling
Attorney, Agent, or Firm—Connolly and Hutz

[57] ABSTRACT

Sulfilimine compounds of formula I

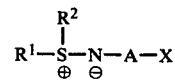

wherein
X is the integrating residue of a photographically active compound $H_2N-A-X$ and
A is a linking member between X and N consisting of a benzene ring having at least two electron-attracting groups are suitable compounds for photographic recording materials. The compounds can be split reductively to release the photographically active compound. Where the photographically active compound is a dye or dye precursor the sulfilimine compounds are suitable dye releasers for color diffusion transfer processes.

6 Claims, No Drawings

PHOTOGRAPHIC RECORDING MATERIAL FOR DIFFUSION PROCESSES AND NEW NON-DIFFUSING SULFILIMINE COMPOUNDS SUITABLE FOR USE THEREIN

This invention relates to a photographic recording material comprising at least one silver halide emulsion layer which contains at least one non-diffusing compound which, as a result of a reduction reaction, releases a diffusible, photographically active compound, in particular a diffusible dye for dye diffusion transfer processes. The non-diffusing compounds of the present invention are new sulfilimine compounds.

In order to carry out the dye diffusion transfer process, a photosensitive element is usually used which contains color-providing compounds, and an image-receiving element, in which the desired color image is produced by diffusible dyes which are transferred image-wise. For this purpose, it is necessary for there to be firm contact between the photosensitive element and the image-receiving element, at least for a finite period of time within the developing time, so that the image-wise distribution of diffusible dyes which is produced in the photosensitive element as a result of development may be transferred to the image-receiving element. The contact may be produced after developing has started, or it may have already been produced before developing commences. The latter is the case, for example, if a recording material is used in which the photosensitive element and the image-receiving element form an integral unit. Embodiments of the dye diffusion transfer process are known in which an integral unit of this type remains even after the developing procedure has been completed, i.e. separation of the photosensitive element from the image-receiving element is not effected even after the color transfer has been completed. However, according to another embodiment, the image-receiving element which carries the finished image after the color transfer may be separated from the photosensitive element, for example by means of a stripping layer positioned between the two elements. Within the context of the present invention, a photographic recording material is a photosensitive element which is positioned on a transparent or opaque substrate and has at least one silver halide emulsion layer and a color-providing compound associated therewith. Moreover, the photographic recording material may contain an image-receiving element in the form of a dyeable layer which is in flat contact with the photosensitive element.

Among the processes known hitherto for the production of colored images according to dye diffusion transfer, those processes are recently becoming increasingly important which are based on the use of color-providing compounds which are embedded in a diffusion-resistant manner and from which diffusible dyes or dye precursors are released image-wise during development and are transferred to an image-receiving layer. Color-providing compounds of this type will be termed hereinafter "dye-releasers".

Included among the dye-releasers which are suitable for this purpose are, for example, the non-diffusing color couplers described in DE-C 1,095,115 which, during developing, release in a diffusible form a pre-formed dye or a dye which is produced during color coupling as a result of a reaction with the oxidation product of a color developer compound consisting of a primary aromatic amine. The selection of necessary developer compounds is naturally restricted to color developers.

Furthermore, reference is to be made to the dye-releasers described in DE-A 1,930,215 which contain, via a releasable hydrazone group, a pre-formed latent diffusible dye radical joined to a radical which confers diffusion resistance. These compounds are not termed color couplers, and it has also been found that the selection of the developer compounds which are necessary to release the diffusible dye is in no way restricted to conventional color developers, but that black and white developers, for example catechols, are also very suitable.

DE-A 1,772,929 also describes non-diffusing colored compounds having a particular group which undergo an oxidative ring closure reaction during developing and, while so doing, release a pre-formed dye radical in a diffusible form. The compounds presented in this publication may be divided into two groups. The compounds of one group require for development a conventional color developer compound, and they couple with the oxidation product thereof and release the pre-formed dye radical in a subsequent ring closure reaction. The compounds of the second group are themselves silver halide developing agents and are thus capable of entering, in oxidized form, into the previously mentioned ring closure reaction with the release of the diffusible dyes, even in the absence of other developer compounds.

Finally, the dye-releasers of DE-A 2,242,762 will also be mentioned at this point. These are sulfonamidophenols and sulfonamidoanilines which are split with the release of diffusible dyes after oxidation effected during development under the influence of the developer alkali.

The dye-releasers which have been mentioned operate, without exception, in a negative manner, i.e., the imagewise distribution of the released diffusible dyes is produced during the use of conventional (negatively operating) silver halide emulsions, in conformity with the negative silver image produced during development. Therefore, in order to produce positive color images, it is necessary to use direct positive silver halide emulsions or, otherwise, to use a suitable reversal process.

However, it is also possible to produce positive color images using negative silver halide emulsions if positively operating dye-releasers are used, i.e. dye-releasers which mainly release the dye in those areas in which little developer oxidation product is formed during development. Compounds of this type usually have a redox-active group which, in a reduced condition, is subject to a splitting-off action under the conditions of photographic development, and a photographically active group, in particular a dye or dye precursor is released in a diffusible form. Depending on whether the color image producing mechanism is introduced by developer oxidation products which are produced image-wise, or by reducing agents present in an image-wise distribution, a distinction is made in the case of dye-releasers of the last mentioned type between oxidizable compounds and reducible compounds.

Oxidizable dye-releasers which release a diffusible dye in a non-oxidized form under the condition of photographic development are described, for example, in DE-A 2,402,900; DE-A 2,543,902; DE-A 2,823,159 and DE-A 2,854,946.

Another dye-supplying system which also results in a reversal of the image and thus may also be combined with negative silver halide emulsions includes reducible dye-releasers. These do not react directly or indirectly with oxidizing substances, for example with the oxidation product of the developer, so that substantially no dye is released in the exposed areas. However, they are reactive to reducing compounds, for example by a direct, or preferably an indirect reaction with unconsumed photographic developer which is mainly available in the unexposed areas. These reducible dye-releasers are split off as a result of reduction so that diffusible, photographically active compounds, in particular dyes or dye precursors are released in the unexposed areas and then diffuse into the image-receiving layer and are fixed in this layer. Examples of reducible dye-releasers are described in DE-A 2,809,716; EP-A 0,004,399, GB-A 8012242; EP-A 0,035,685 and DE-A 3,015,669.

In a particularly preferred embodiment, the last-mentioned reducible dye-releasers are used combined with an electron donor compound (ED compound) or with an electron donor precursor compound (ED precursor compound) which supplies the electrons necessary for the dye-releasing reaction. Thus, if an ED compound or an ED precursor compound is present in an image-wise distribution in the photographic recording material which contains the non-diffusing reducible dye-releasers, then diffusible photographically active compounds are released in an image-wise distribution by the reaction of the ED compound with the reducible dye-releaser.

Compared to oxidizable dye-releasers, reducible dye-releaser provides various advantages which lie particularly in the fact that the release of the diffusible photographically active compounds may be controlled in an improved manner and, consequently, the color separation may be improved and the formation of an undesirable color fog may be suppressed. Nevertheless, it is desirable further to improve the properties of such dye-supplying systems which operate in a positive manner combined with negative silver halide emulsions. When it is considered that several chemical reactions have to preceed the production of the diffusible dye, namely at least the photographic developing reaction and the reaction of the photographic developer via the ED compounds or ED precursor compounds with the dye-releaser embedded in a diffusion-resistant manner, these reactions being to some extent relatively complicated and, moreover, the different reactions having to take place in strict succession with respect to time in order to prevent the production of diffusible dye in undesirable areas, then it becomes clear that a number of degrees of freedom are necessary, in particular in the selection of the different reaction components.

Another difficulty is that the compounds necessary within the frame of the reaction courses described must be able to be embedded as simply as possible in photographic layers so as not to complicate the production of the photographic recording materials. Moreover, there is, of course, the requirement for an adequate stability of the compounds necessary for the reaction course and in particular, the requirement for as high a light stability as possible of the dyes which are released.

Since the compounds which participate in the reaction course described have to some extent a relatively complicated chemical structure, it is also desirable further to improve the existing systems and to replace them by other systems which can be more easily produced.

The color-providing compounds, described in EP-A 0,035,685 may be characterised as reducible dye-releasers which are split off by reduction under the conditions of photographic development, with the release of diffusible photographically active compounds, in particular dyes or dye precursors. This splitting mechanism is expressed by the term "CR compound" (cleavage by reduction). In chemical terms, the compounds of EP-A 0,035,685 belong to the class of sulfilimines. Of the previously mentioned reducible dye-releasers of different reaction methods, the CR compounds are distinguished as follows. The first have to be initially reduced and are then subject to cleavage induced by bases. The dependence on the pH value which is stipulated thereby may lead to disadvantages. The CR compounds according to the present invention have, however, the advantage that the cleavage takes place by the reaction with the ED compounds and subsequent hydrolysis is unnecessary. Although the CR compounds of EP-A 0,035,685 already substantially meet the requirements imposed thereon, there is still a certain disadvantage in that the reductive cleavage still does not take place fast enough under the conditions of photographic development or it requires a comparatively high concentration of ED compounds.

The object of the present invention is to provide new reductively cleavable compounds and recording materials which contain such new reductively cleavable compounds. The new compounds should have a ballast group and thus it should be possible for them to be embedded in a diffusion-resistant form in photographic recording materials. Compared with known sulfilimine compounds, they should be more easily reducible and should thus require for their cleavage smaller quantities of ED compounds and consequently smaller quantities of silver halide as well.

The present invention provides a photographic recording material comprising at least one photosensitive silver halide emulsion layer and a non-diffusing sulfilimine compound associated therewith which is capable of releasing a diffusible photographically active compound by reduction under photographic developing conditions, characterized in that the sulfilimine compound corresponds to the following formula I:

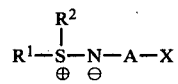

wherein
R$^1$ and R$^2$ represent the same or different aryl radicals, at least one of which contains at least one electron-attracting group in the o- or p-position, and at least one of which contains a ballast group;
A represents a linking member between N and X, consisting of a benzene ring which is directly bonded to N at the 1-position, and which has an electron-attracting group in the 2-position of the benzene ring and at least one other electron-attracting group in the 4- or 6-position of the benzene ring and
X represents an integrating radical which is released from the sulfilimine compound together with A and N as a diffusible photographically active compound corresponding to the formula H$_2$N—A—X.

The aryl radicals represented by $R^1$ and $R^2$ are preferably phenyl radicals which, in addition to the electron-attracting groups and ballast groups mentioned, may optionally also contain additional substituents, such as halogen, hydroxy, alkoxy, acyloxy, acylamino or alkyl, and optionally a benzene ring condensed thereon.

Nitro groups are mainly included as electron-attracting groups in the aryl radicals $R^1$ and $R^2$, but the following are also included, for example: $-CF_3$, $-CN$, sulfamoyl, alkylsulfonyl, carbalkoxy or carbamoyl. The electron-attracting group which is necessarily present at least once and the ballast group which is also necessarily present at least once may be positioned on the same aryl radical ($R^1$, $R^2$), and they may even be combined in a single substituent, for example in the form of a sulfamoyl group which is substituted at the nitrogen atom by a comparatively long alkyl radical.

Those radicals are to be considered as a ballast group which allow the sulfilimine compounds according to the present invention to be embedded in a diffusion-resistant manner in hydrophilic colloids which are usually used in photographic materials. For this purpose, organic radicals are preferably suitable which generally contain straight- or branched-chain aliphatic groups generally having from 8 to 22 carbon atoms, and optionally also carbocyclic or heterocyclic, optionally aromatic groups. These radicals are joined to the remaining part of the molecule directly or indirectly, for example via one of the following groups: $-NHCO-$, $-NH-SO_2-$, $-NR-$, R representing hydrogen or alkyl, $-O-$ or $-S-$. The ballast group may also contain water-solubilizing substituents, for example sulfo groups or carboxyl groups which, in certain cases, may also be present in an anionic form. Since the diffusion properties depend on the size of the molecule of the total compound which is used, in certain cases, for example if the total molecule which is used is large enough, or if the sulfilimine compounds are worked into the layers in an emulisified form using so-called oil formers or high-boiling coupler solvents, it suffices to also use comparatively short chain radicals as ballast groups, for example isoamyl radicals or tertiary butyl radicals.

The photographically active compounds corresponding to the formula $H_2N-A-X$ which are released by reduction from the sulfilimine compounds according to the present invention are, for example, dyes or dye precursors, but are also other non-dye-forming photographically active compounds, such as stabilizers, development inhibitors and bleaching accelerators. Accordingly, X represents the integrating radical of a dye, a dye precursor or another non-dye-forming photographically active compound. The term "integrating" expresses the fact that the relevant properties do not only have to be exclusively attributed to the group X, but in certain cases, are only produced by the combination of X and A. Thus, for example, X may represent the radical of a dye, i.e., a group which is already colored per se, or a radical which only produces a dye together with the group A, so that in the latter case, the formula $-A-X$ would have to be attributed to the dye radical.

In principle, the radicals of dyes of all dye classes are suitable as dye radicals, if they are diffusible enough to be able to diffuse through the layers of the photosensitive material into the image-receiving layer. For this purpose, the dye radicals may be provided with one or more alkali-solubilizing groups. The following are suitable, inter alia, as alkali solubilizing groups: carboxyl groups, sulfo groups, sulphonamide groups and aromatic hydroxyl groups. Such alkali-solubilizing groups may already be pre-formed in the dye-releasers used according to the present invention, or may only result from the cleavage of the dye radical from the carrier radical provided with ballast groups. The following should be mentioned as dyes which are particularly suitable for the present process: azo dyes, azomethine dyes, anthraquinone dyes, phthalocyanine dyes, indigoid dyes, triphenylmethane dyes, including those dyes which are complexed or may be complexed with metal ions.

The term "radicals of dye precursors" is understood as designating the radicals of those compounds which are converted into dyes during photographic processing by conventional or additional processing steps, whether by oxidation, by coupling, by complex formation or by exposing an auxochromic group in a chromophoric system, for example by saponification. Dye precursors in this sense may be leuko dyes, couplers or dyes which are converted into other dyes during processing. As far as a difference between dye radicals and the radicals of dye precursors is not of essential importance, the latter should also be understood in the following by the term "dye radicals".

Suitable sulfilimine compounds of the present invention correspond, for example, to the following formula II:

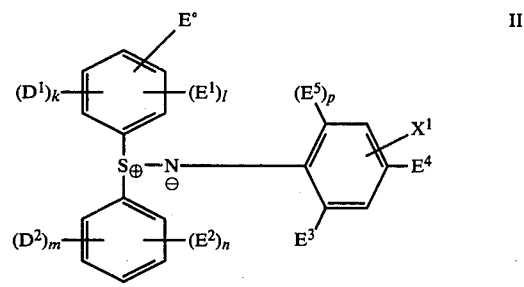

wherein
$E^0$, $E^1$, $E^2$ represent electron-attracting groups in the o- or p- position with regard to the sulfur atom,
$D^1$, $D^2$ represent ballast groups,
k,l,m,n,p each represent 0 or 1, provided that $k+m \geq 1$,
$X^1$ represents an integrating radical of a photographically active compound which is either directly bound to the benzene ring, or is contained either in $E^4$ or in $E^5$ as a substituent, and is released from the sulfilimine compound together with N and the benzene ring as a diffusible photographically active compound corresponding to the formula:

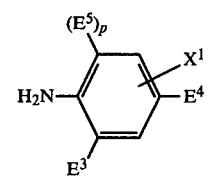

The following, for example are included as electron-attracting groups $E^0$, $E^1$, $E^2$, $E^3$, $E^4$ and $E^5$: $-NO_2$, $-CF_3$, $-CN$, alkylsulfonyl, sulfamoyl, carbalkoxy and carbamoyl. $E^0$ preferably represents $-NO_2$, alkylsulfonyl or sulfamoyl, and $E^3$ preferably represents $-NO_2$.

No particular requirements are imposed on the spatial scope of the electron-attracting groups, with the single proviso that the substituents which are optionally present in $E^3$, $E^4$ and $E^5$ should not hinder the diffusibility of the photographically active compound which is released.

The sulfamoyl groups or carbamoyl groups mentioned in the definition of $E^0$, $E^1$, $E^2$, $E^3$, $E^4$, $E^5$ may be unsubstituted or substituted at the nitrogen atom, for example with alkyl or aryl. The nitrogen atom may also be part of a cyclic amino group (pyrrolidino, piperidino, morpholino). The alkyl portion contained in one of the carbalkoxy, alkylsulfonyl and alkyl-substituted sulfamoyl or carbamoyl groups mentioned in the definition of $E^0$, $E^1$, $E^2$, $E^3$, $E^4$ and $R^5$ or in one of the additional substituents mentioned, such as alkoxy, acyloxy or acylamino, may include up to 22 carbon atoms in the case of $E^0$, $E^1$ and $E^2$, and may optionally carry other substituents, such as hydroxy, halogen, alkoxy or aryloxy.

$X^1$ represents the radical of a dye, a dye precursor or another non-dye-forming photographically active compound, or a radical which, together with the phenyl ring to which it is bound, forms the radical of a photographically active compound. In the case of color-providing sulfilimine compounds (dye-releasers) of the present invention, $X^1$ represents for example the radical of an azo dye or an arylazo radical (part of an azo dye).

Sulfilimine compounds of the present invention which are particularly preferred correspond to the following formula III (dye-releasers):

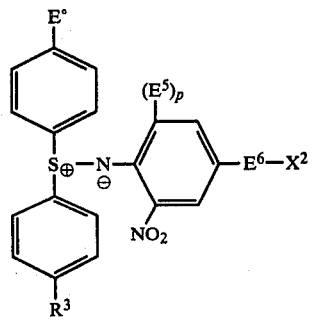

wherein
$E^0$ represents —$NO_2$, alkylsulfonyl or sulfamoyl,
$R^3$ represents hydrogen, halogen, alkyl, alkoxy, acylamino, carbamoyl or sulfamoyl, at least one of the radicals $E^0$ and $R^3$ containing a ballast radical,
$E^5$ represents —$NO_2$, —$CF_3$, —CN, alkylsulfonyl, sulfamoyl, carbalkoxy or carbamoyl,
$E^6$ represents —CO—$(R^4)_q$— or —$SO_2$—$(R^4)_q$—,
$R^4$ represents alkylene having up to 4 carbon atoms,
p, q, represents 0 or 1, and
$X^2$ represent a radical of a dye or of a dye precursor.

Acyl radicals which occur, for example in substituents of the aryl groups represented by $R^1$ and $R^2$ (acyloxy, acylamino) or in an acylamino group represented by $R^3$ are derived from organic carboxylic acids or sulfonic acids by removing a hydroxyl group from the carboxy or sulfo groups. Acetyl, pivaloyl, pyruvoyl, hexadecanoyl, benzoyl, N-octadecylcarbamoyl, N-octadecyloxycarbonyl, methylsulfonyl and p-toluene sulfonyl are examples of such acyl radicals.

Examples of non-diffusing sulfilimine compounds which are suitable according to the present invention and which release diffusible dyes during reduction are shown in the following two Tables.

TABLE 1

(Formula IV)

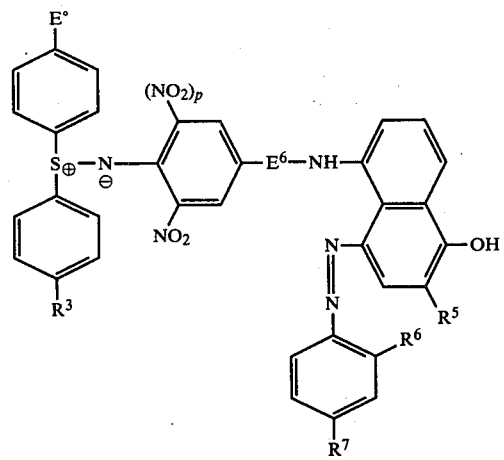

| No. | E° | $R^3$ | p | $E^6$ | $R^5$ | $R^6$ | $R^7$ | color |
|---|---|---|---|---|---|---|---|---|
| 1 | $NO_2$ | $NHCOC_{15}H_{31}$ | 0 | CO | H | $SO_2CH_3$ | $NO_2$ | c |
| 2 | $NO_2$ | $NHCOC_{15}H_{31}$ | 0 | CO | H | H | $SO_2NH_2$ | m |
| 3 | $NO_2$ | $NHCOC_{15}H_{31}$ | 1 | CO | H | $SO_2CH_3$ | $NO_2$ | c |
| 4 | $NO_2$ | $NHCOC_{15}H_{31}$ | 1 | CO | H | H | $SO_2NH_2$ | m |
| 5 | $SO_2CH_3$ | $SO_2N(CH_3)C_{18}H_{37}$ | 0 | CO | H | H | $SO_2NH_2$ | m |

TABLE 1-continued
(Formula IV)

[Structure IV: sulfilimine naphthol azo dye with substituents E°, R³, (NO₂)ₚ, E⁶-NH, R⁵, R⁶, R⁷]

| No. | E° | R³ | p | E⁶ | R⁵ | R⁶ | R⁷ | color |
|---|---|---|---|---|---|---|---|---|
| 6 | SO₂NH–C₁₆H₃₃ | t-C₄H₉ | 0 | CO | H | SO₂CH₃ | NO₂ | c |
| 7 | SO₂N(CH₃)–CH₃ | NHCOC₁₅H₃₁ | 0 | SO₂ | SO₂NHC₄H₉ | SO₂CH₃ | NO₂ | c |
| 8 | SO₂CH₃ | SO₂N(CH₃)C₁₈H₃₇ | 0 | SO₂ | SO₂NHC₄H₉ | SO₂CH₃ | NO₂ | c |
| 9 | NO₂ | NHCOC₁₅H₃₁ | 0 | SO₂ | SO₂NHC₄H₉ | SO₂CH₃ | NO₂ | c |
| 10 | NO₂ | NHCOC₁₅H₃₁ | 0 | SO₂ | SO₂NHC₄H₉ | SO₂NHC₄H₉ | NO₂ | c |
| 11 | NO₂ | NHCOC₁₅H₃₁ | 0 | SO₂ | H | SO₂NH₂ | NO₂ | c |
| 12 | NO₂ | NHCOC₁₅H₃₁ | 0 | SO₂ | H | SO₂NHC₄H₉ | NO₂ | c |
| 13 | NO₂ | NHCOC₁₅H₃₁ | 0 | CO | H | SO₂NH₂ | NO₂ | c | c = cyan
m = magenta

TABLE 2
(Formula IV)

[Structure V: sulfilimine pyrazolone azo dye with substituents R³, E⁶, R⁸, R⁹]

| No. | R³ | E⁶ | R⁸ | R⁹ | color |
|---|---|---|---|---|---|
| 14 | NHCOC₁₅H₃₁ | CO | CH₃ | 3-SO₂NH₂ | Yellow |
| 15 | OC₁₈H₁₇ | CO | CN | 4-SO₂NH₂ | Yellow |
| 16 | NHCOC₁₅H₃₁ | SO₂ | CH₃ | 3-SO₂NH₂ | Yellow |
| 17 | OC₁₈H₃₇ | SO₂ | CN | 4-SO₂NH₂ | Yellow |

It is possible to produce the sulfilimine dye-releasers by aminating the corresponding thioethers R¹—S—R² with mesitylsulfonyl-O-hydroxylamine (MSH) VI and by subsequently reacting the resulting sulfilimine-mesitylate VII with dye halides VIII $$R^1\text{---}\underset{R^2}{S} + H_2N\text{---}O\text{---}SO_2\text{---}\text{mesityl} \longrightarrow \quad VI$$

$$R^1\text{---}\overset{R^2}{\underset{\oplus}{S}}\text{---}NH_2 \quad \ominus O\text{---}SO_2\text{---}\text{mesityl} \quad VII$$

$$VII + Hal\text{---}\underset{NO_2}{\text{Ar}}\text{---}E^6\text{---}X^2 \longrightarrow III \quad VIII$$

Reference is made to Chem. Rev. 77, 409 et seq. (1977) concerning the chemistry of the sulfilimine compounds.

The production of the sulfilimine dye-releasers according to the present invention will now be described in the following with reference to some Examples. Other compounds selected from those mentioned above or other compounds which come under the general formulae I and II are produced analogously. The dye portion of the CR dye-releasers corresponds in constitution to typical dyes which are conventionally used in photographic materials and in processes in which diffusible dyes are used.

SULFILIMINE DYE NO. 2:

Stage 1

4-nitro-4'-palmitoylamino-diphenyl-sulfiliminemesitylate 8.6 g of mesitylsulfonyl-O-hydroxylamine (0.4 moles) (Y. Tamura I. Minamihawa, M. Ikeda, Synthesis 1977,1) were dissolved in 80 ml of methylene chloride and added dropwise with stirring at 0° C. to a suspension of 9.7 g (0.2 mols) of 4-nitro-4'-palmitoylaminodiphenylsulfide in 80 ml of methylene chloride. A clear solution was produced over a period of 3 hours, from which the mesitylate slowly crystallized. The deposit was suction filtered and washed with ether. Yield 12.5 g≙90.2% of the theoretical yield.

Stage 2

5-(3'-nitro-4'-fluorobenzoylamino)-1-naphthol 22.4 g of 3-nitro-4-fluorobenzoyl chloride (0.12 mols) were added dropwise at 0° C. to a suspension of 19.1 g of 5-amino-1-naphthol (0.12 mols) in 120 ml of acetonitrile and 14.2 g of N,N-dimethylaniline. The mixture was further stirred until it reached room temperature, and then heated for 30 minutes at 50° C. The yellow deposit was suction filtered and washed with acetonitrile. The deposit was dissolved in tetrahydrofurane and stirred with charcoal, filtered and the product was precipitated from the filtrate with petrol 50/75. Yield: 25.8 g≙66% of the theoretical yield; mp. 235°-238° C.

Stage 3

4-(4'-sulfamoylphenylazo)-5-(3"-nitro-4"-fluorobenzoylamino)-1-naphthol 3.65 g of 4-aminobenzene sulfonamide (0.212 mols) were dissolved in 6 ml of concentrated hydrochloric acid and 25 ml of water, and diazotized with 1.5 g of sodium nitrate, dissolved in 7 ml of water. The diazonium salt solution was added dropwise at about 0° C. to a solution of 6.25 g of the compound from stage 2 (0.20 mols) in 80 ml of pyridine and 40 ml of water. The mixture was then stirred for 2 hours and precipitated on ice/hydrochloric acid. The dye was purified from methanol. Yield: 5.95 g≙58.5% of the theoretical yield; mp. 196°-200° C.

Stage 4

Sulfilimine dye No. 2.

1.4 g of the sulfilimine mesitylate from stage 1 (2 mmol), 1.02 g of the dye from stage 3 (2 mmol) and 0.55 g of potash were stirred into 20 ml of dioxane for 60 hours at room temperature. The reaction product was suction filtered and purified by column chromatography in a solvent mixture of toluene:ethyl acetate:acetone 2:2:1. Yield: 0.78 g≙39.5% of the theoretical yield; mp. 149°-150° C.

SULFILIMINE DYE NO. 9

Stage 1

5-acetamino-1-acetoxynaphthalene-2-sulfonic acid-Na-salt 48 g of 5-amino-1-naphthol-2-sulfonic acid (0.2 mols) were heated with 80 ml of acetic anhydride and 40 ml of pyridine at a temperature of from 110° to 120° C. for 130 minutes. The cooled solution was extracted twice with 500 ml of benzene, and an oily residue was obtained which was absorbed in 500 ml of saturated NaCl solution. After concentrating, it was taken up with methanol and filtered off from NaCl. This procedure was repeated until NaCl was no longer produced. The residue was brought to crystallization with acetonitrile. Yield: 60 g≙87%.

Stage 2

5-acetamino-1-acetoxynaphthalene-2-sulfonic acid chloride 34.5 g of the compound from stage 1 (0.1 mols) were stirred with 140 ml of $POCl_3$ under nitrogen and slowly mixed with 7.75 ml of dimethyl formamide (0.1 mols). After another hour, the mixture was poured onto ice, suction filtered and dried. Yield: 19 g≙55% of the theoretical yield. mp: 148°-155° C.

Stage 3

5-acetamino-1-acetoxynaphthalene-2-sulfonic acid-tert.-butylamide.

14.5 g of t-butylamine in 50 ml of acetone were added dropwise to a solution of 18.8 g of the compound from stage 2 (0.55 mols) in 150 ml of acetone at −5° to 0° C. The mixture was further stirred overnight, filtered off from the deposit, concentrated and crystallized from ether with a little acetonitrile. Yield: 19.2 g≙92% of the theoretical yield; mp: 203°-206° C.

Stage 4

5-amino-1-naphthol-2-sulfonic acid-t-butylamide 7.56 g of the compound from stage 3 (0.02 mols) were stirred with 30 ml of 30% KOH under nitrogen for 30 hours at 100° C. The cooled solution was suction filtered, and the product was dissolved in water, acidified and filtered. Yield: 4.4 g≙75% of the theoretical yield; mp 184°-185° C.

Stage 5

5-(3'-nitro-4'-fluorophenylsulfonamido)-1-naphthol-2-sulfonic acid-t-butylamide 2.4 g of 3-nitro-4-fluorophenylsulfochloride (0.01 mol) in 10 ml of pyridine were added dropwise to a solution of 2.94 g of the compound from stage 4 (0.01 mol) in 10 ml of pyridine, with stirring and at −5° C. At the end of the reaction, the mixture was poured onto iced water, acidified and suction filtered. The crude product was dissolved in methanol, stirred with charcoal, filtered and concentrated. Crystallization from ether/benzene. Yield: 3 g≙60% of the theoretical yield; mp. 171°-172° C.

Stage 6

4-(4'-nitro-2'-methylsulfonylphenylazo)-5-(3''-nitro-4''-fluorophenylsulfonamido-1-naphthol)-2-sulfonic acid-6-butylamide.

2.37 g of 5-nitro-2-aminophenyl-methylsulfone (0.011 mols) in 15 ml of glacial acetic acid were mixed dropwise in 1.6 ml of nitrosyl sulfuric acid (0.033 mols) with stirring and at 15° C. This diazonium salt solution was then stirred for 20 minutes and transferred by pipette to a solution of 5.5 g of the compound from stage 5 (0.11 mols) in 100 ml of methanol at −5° C. The mixture was then stirred for 2 hours, mixed with 100 ml of cold water, suction filtered and dried. Yield 5.7≙71% of the theoretical yield.

Stage 7

SULFILIMINE DYE NO. 9

3.68 g of the sulfilimine mesitylate from stage 1 of dye No. 2 (0.00527 mols) were stirred into 15 ml of dioxane and 15 ml of ethanol with 0.73 g of potash for 1 hour at room temperature, and then mixed with 2.8 g of the dye from stage 6 (0.00385 mols). The mixture was stirred for 2 hours, filtered and concentrated, and the residue was purified by column chromatography in a mixture of ethyl acetat:acetonitrile 20:1. Yield: 3.2 g≙69% of the theoretical yield; mp. 185°–192° C.

SULFILIMINE DYE NO. 13

Stage 1

4-(4'-nitro-2'-sufamoyl-phenylazo)-5-(3''-nitro-4''-fluorobenzoyl amino)-1-naphthol 3.0 g of 6-amino-3-nitro-benzene-sulfonic acid amide (15 mmol) were suspended in 26.2 ml of glacial acetic acid and 7.5 ml of methanol, and then diazotized with 3 ml of nitrosyl sulfuric acid (58.2 mmol) at from 10° to 15° C. The diazonium salt solution was added dropwise at about 0° C. to a solution of 4.55 g of the compound from stage 2 of dye No. 2 (14 mmol) in 4.8 ml of pyridine and 100 ml of methanol. The mixture was then stirred for 3 hours and the deposit was suction filtered and dried. Yield: 3.9 g≙71.8% of the theoretical yield; mp. 195°–200° C.

Stage 2

SULFILIMINE DYE NO. 13

1.4 g of the sulfilimine mesitylate from stage 1 (2 mmol) of dye No. 2, 1.18 g of the dye from stage 1 (2 mmol) and 0.55 g of potash (4 mmol) were stirred in to 25 ml of dimethylformamide for 6 hours at room temperature. The reaction solution was poured onto water/glacial acetic acid and extracted with acetic ester. The crude product was purified by column chromatography in a solvent mixture of ethyl acetate:methanol 1:1. Yield: 1.26 g≙61% of the theoretical yield; mp. 203°–206° C.

SULPHILIMINE DYE NO. 16

Stage 1

4-(3'-acetamino-6'-methoxy-phenylazo)-1-(3''-sulfamoylphenyl)-3-methylpyrazolone-5

7.2 g of 2-amino-4-acetylaminoanisole (40 mmol) were suspended in 12 ml of concentrated hydrochloric acid (120 mmol) and 80 ml of water, and diazotized with 2.76 g of sodium nitrite (40 mmol) at 0° C. The diazonium salt solution was added dropwise to a solution of 10.4 g of 1-(3-aminosulfonylphenyl)-3-methylpyrazolone (37 mmol) in 60 ml of 2 N sodium hydroxide (120 mmol) and 80 ml of water. The mixture was stirred for 1 hour at 0° C., and the deposit was then suction filtered. Yield 17.15 g≙89.5% of the theoretical yield; mp. 312°–314° C.

Stage 2

4-(3'-amino-6'-methoxy-phenylazo)-1-(3''-sulfamoylphenyl)-3-methyl-pyrazolone-5

7.2 g of the compound from stage 1 (0.016 mols) were saponified with 120 ml of water and 21.4 ml of 30% sodium hydroxide (0.016 mols) over a period of 2½ hours under reflux. The reaction solution was mixed cold with acetic ester and the deposit was suction filtered. Yield: 5.5 g≙84.5% of the theoretical yield; mp. 249°–251° C.

Stage 3

3-(3''-nitro-4''-fluoro-phenyl-sulfamoylphenyl)-6'-methoxyphenylazo)-1-(3''-sulfamoyl-phenyl)-3-methyl-pyrazolone-5

4.02 g of the compound from stage 2 (10 mmol) were suspended with 50 ml of acetonitrile and 750 mg (10 mmol) of pyridine and reacted at 0° C. with 2.39 g of 3-nitro-4-fluoro-phenyl-sulfochloride (10 mmol). Yield: 5.02 g≙82.5% of the theoretical yield; mp. 273°–278° C.

Stage 4

SULFILIMINE DYE NO. 16

1.4 g of the sulfilimine mesitylate from stage 2 of the production of dye No. 2 (2 mmol), 1.21 g of the dye from stage 3 and 276 mg (2 mmol) of potash were heated for 3 hours in 60 ml of ethanol. The deposit was suction filtered cold and separated by column chromatography in a solvent mixture of toluene: acetonitrile-ethyl acetate 40:20:10. Yield: 1.13≙52% of the theoretical yield: mp. 157°–160° C.

The reducible, reductively cleavable dye-releasers of the present invention are appropriately used together with so-called electron donor compounds (ED compounds). The latter act as a reducing agent which is consumed image-wise during the development of the silver halide and reduces with its unconsumed proportion for its part the associated dye-releaser and thereby causes splitting off of the dye. ED compounds which are suitable are, for example, non-diffusing or only slightly diffusing derivatives of hydroquinone, of benzisoxazolone, of p-aminophenol or of ascorbic acid (for example ascorbyl palmitate) which are described, for example, in DE-A 2,809,716. Other suitable compounds are described in DE-A 2,947,425. According to the present invention, the ED compounds may also be in a masked form as so-called ED precursor compounds which indeed do not themselves act as a reducing agent with respect to exposed silver halide or reducible color-providing compounds, but which are converted into the actual ED compounds under the alkaline development conditions.

Such ED compounds are described, for example, in Research Disclosure 19 429 (June 1979) and 19507 (July 1979) and in DE-A 3,006,368.

The following, for example, are suitable as ED compounds or ED precursor compounds:

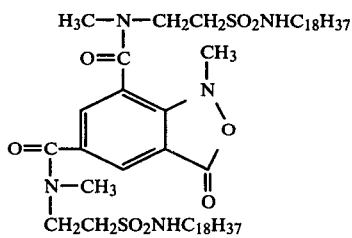 ED 1

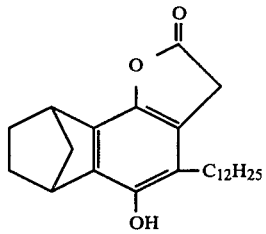 ED 2

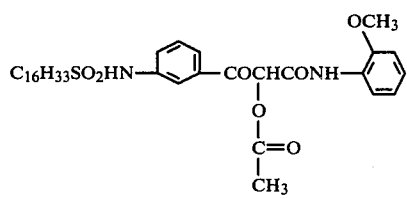 ED 3

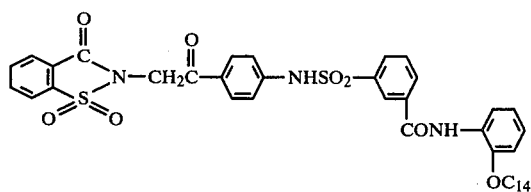 ED 4

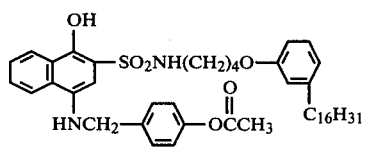 ED 5

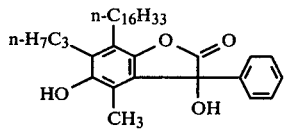 ED 6

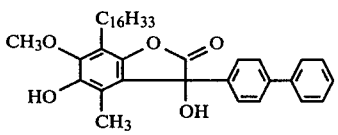 ED 7

The ED precursor compounds of the type of compounds ED-6 and ED-7 shown above, which may be defined by the following general formula, are of very particular significance for use combined with the CR compounds according to the present invention.

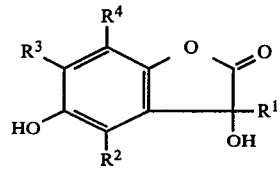 III wherein:
R$^1$ represents a carbocyclic or heterocyclic aromatic radical, and R$^2$, R$^3$ and R$^4$ represent the same or different substituents that is hydrogen, alkyl, alkenyl, aryl, alkoxy, alkylthio, amino or R$^3$ and R$^4$ together complete a condensed ring, particularly a carbocyclic ring, and at least one of the substituents R$^1$, R$^2$, R$^3$ and R$^4$ contains a ballast radical having from 10 to 22 carbon atoms which confers diffusion resistance.

Owing to the combination of such ED precursor compounds with the CR compounds according to the present invention, outstanding color densities and images are obtained without virtually any disturbing fog.

The photosensitive element of the photographic recording material according to the present invention usually contains, i.e. if multi-colored transfer images are to be produced, three image-producing layer units, each of which contains at least one photosensitive silver halide emulsion layer and a combination associated therewith of a non-diffusing, reducible dye-releaser and an ED-compound. One of the layer units is mainly sensitive to blue light, another to green light and a third to red light, and the associated dye-releasers supply in each case complementary-colored image dyes. However, the process according to the present invention is in no way restricted to the production of multi-colored images, but may also be carried out with a recording material which contains less than three image-producing layer units, for example only a single unit.

The terms "association" and "associated" are understood as signifying that the mutual arrangment of silver halide emulsion, ED compounds and dye-releasers is such that an interaction is possible between them, which allows an image-wise conformity between the silver image formed during development and the consumption of ED compound on the one hand, and a reaction between the unconsumed ED compound and the dye-releaser on the other hand, so that an image-wise distribution of diffusible dye is produced in conformity with the undeveloped silver halide. For this purpose, photosensitive silver halide and a combination of dye-releaser and ED compound do not necessarily have to be in the same layer. They may also be accommodated in adjacent layers which in case belong to the same layer unit.

However, in order to ensure a sufficient interaction between the dye-releaser and the associated ED compound, it is advisable to accommodate these two compounds of one combination in the same layer which, however, does not have to be identical to the associated silver halide emulsion layer.

The dye releasers and ED compounds may be incorporated by any methods according to which hydrophobic compounds are usually worked into photographic layers, i.e., conventional emulsifying techniques are included, for example methods according to which photographic auxiliaries are added to the casting solutions in the form of emulsions using so-called oil formers.

The dye-releaser is usually used in a layer in a sufficient quantity to produce a color image having as high a maximum color density as possible, for example in a quantity of from 1 to $20.10^{-4}$ mols/m$^2$. The ED compound is adapted in quantity to that of the dye-releaser. It should be large enough to achieve as high a maximum color density as possible. i.e., to be able to cause as complete a reduction as possible of the dye-releaser. On the other hand, it should not be substantially higher than is necessary for this purpose, so that the reducing agent may be consumed as completely as possible in the exposed areas by the development of the exposed silver halide. The quantity ratios which are most favourable in each individual case between silver halide, ED compound and dye-releaser are appropriately determined by routine tests. For example, reliable results may be obtained when the ED compound in each case is in a 0.5 to 5 times molar quantity, based on the dye-releaser. The suitable quantity ratio between silver halide and associated dye-releaser approximately ranges from 2 to 20 mols of silver halide per mol of dye-releaser.

In order to obtain positive color transfer images, the non-diffusing, reducible dye-releasers are used in combination with negatively operating silver halide emulsions. In principle, all conventional negative emulsions are included for this purpose, as long as they may be developed quickly enough. As silver halide, they may contain silver chloride and silver bromide, optionally with a content of silver iodide of up to 10 mol%. For example, suitable emulsions are those in which the silver halide consists for the most part of silver chloride, for example more than 70 mol% of silver chloride.

Intermediate layers are appropriately provided between different layer units, which intermediate layers may contain compounds which are capable of reacting with diffusing development products and are capable of preventing the diffusion thereof from one layer unit into another. This contributes to the fact that the association remains restricted in each case to one layer unit. Such compounds are known. For example, non-diffusing hydroquinone derivatives and, for example, the "scavenger compounds" described in the publication "Research Disclosure No. 17 842" (February 1979) are suitable for this purpose. Last but not least, ED compounds may also take over this function when they are embedded in a dividing layer between different layer units.

The interaction between the exposed silver halide and the ED compound is generally caused by the oxidized form of the silver halide developing agent which is used. The latter is oxidized image-wise during development, and the oxidation product for its part is capable of oxidizing the ED compound, and thus withdrawing it from the reaction with the dye-releaser. The interaction between the non-oxidized ED compound and the dye-releaser takes place directly or with the co-operation of an electron transfer agent.

Hydroquinone compounds, for example, are typical suitable electron transfer agents, for example: hydroquinone, 2,5-dichlorohydroquinone and 2-chlorohydroquinone; aminophenol compounds, for example 2-aminophenol, N-methylaminophenol, 3-methyl-4-aminophenol and 3,5-di-bromoaminophenol; catechol compounds, such as catechol, 4-cyclohexylcatechol, 3-methoxycatechol and 4-(N-octadecylamino)-catechol; phenylene diamine compounds, for example, N,N-diethyl-p-phenylenediamine, 3-methyl-N,N-diethyl-p-phenylenediamine, 3-methoxy-N-ethyl-N-hydroxyethyl-p-phenylenediamine, and N,N,N',N'-tetramethyl-p-phenylenediamine.

A 3-pyrazolidone compound used for development is also often suitable as an electron transfer agent, for example: 1-phenyl-3-pyrazolidone, 1-phenyl-4,4-dimethyl-3-pyrazolidone, 4-hydroxymethyl-4-methyl-1-phenyl-3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis-(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(3-chlorophenyl)-3-pyrazolidone, 1-(4-chlorophenyl)-3-pyrazolidone, 1-(4-tolyl)-4-methyl-3-pyrazolidone, 1-(2-tolyl)-4-methyl-3-pyrazolidone, 1-(4-tolyl)-4-hydroxymethyl-4-methyl-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone and 5-methyl-3-pyrazolidone.

A combination of different electron transfer agent may also be used, for example a combination of the type described in U.S. Pat. No. 3,039,869.

The developer compounds may be used in the development liquid or may be at least partly accommodated in any layer of the photographic recording material, for example in one or more silver halide emulsion layers, in layers in which the dye-releasers are accommodated, in intermediate layers or in image-receiving layers.

The optimum electron transfer compound in the individual case depends, of course, on the ED compound which is used in the individual case, on the reducible dye-releaser and on the development conditions of the recording material used.

In addition to containing the photosensitive element which is positioned on a transparent or opaque layer support, a photographic recording material according to the present invention which is suitable for the production of colored diffusion images may also contain other layer elements, for example of an opaque light-absorbing or light-reflecting binder layer which is permeable to aqueous-alkaline development chemicals, a binder layer which may be dyed by diffusible dyes or colour-forming substances (image-receiving element) and optionally layers of a so-called neutralization system. Such a system includes in a known manner at least one acid layer which is used to reduce the pH value after development, and optionally one or more retarding layers which prevent a premature pH reduction.

The dyeable layer may be any type of layer which is capable of taking up an image-wise distribution of diffusible dyes and is capable of retaining it after drying under the color transfer conditions. In the simplest case, absorbent or swellable materials are included for this purpose, for example certain types of paper, textile fabrics or layers of hydrophilic binders, for example gelatin. The dyeable layer preferably also contains dye mordants. The dyeable layer may be positioned on the same layer support as the photosensitive element, or if it is not a constituent of the photosensitive recording material, it may be positioned on a separate layer support.

The dyeable layer is, for example, a layer of a binder, which contains mordants for fixing the diffusible dyes released from the non-diffusing dye-releasers. Long-chain quaternary ammonium or phosphonium compounds are preferably used as mordants for anionic dyes, for example those of the type described in U.S.

Pat. Nos. 3,271,147 and 3,271,148. Furthermore, certain metal salts and hydroxides thereof which form sparingly soluble compounds with the acid dyes may also be used. Polymeric mordants should also be mentioned at this point, such as those described in DE-A 2,315,304, DE-A 2,631,521 or DE-A 2,941,818. The dye mordants are dispersed in the mordant layer in one of the conventional hydrophilic binders, for example in gelatin, polyvinylpyrrolidone, or in completely or partly hydrolysed cellulose esters. Of course, some binders may also function as mordants, for example mixed polymers or polymer mixtures of vinyl alcohol and N-vinylpyrrolidone, as described, for example, in DE-B 1,130,284, also those which are polymers of nitrogen-containing quaternary bases, for example polymers of N-methyl-2-vinylpyridine, as described, for example in U.S. Pat. No. 2,484,430. Other mordanting binders which may be used include, for example, guanyl hydrazone derivatives of alkylvinyl ketone polymers, as described, for example, in U.S. Pat. No. 2,882,156, or guanylhydrazone derivatives of acylstyrenepolymers, as described, for example, in DE-A 2,009,498. However, other binders, for example, gelatin, are generally added to the last-mentioned mordanting binders.

Moreover, the dyeable layer or a layer next to such a layer may contain heavy metal ions, in particular copper or nickel ions, in case diffusible dyes or dye precursors which may be complexed by heavy metal ions during development are released. The metal ions may be in the image-receiving layer in a complex bound form. for example bound to certain polymers, as described in Research Disclosure 18 534 (Sept. 1979) or in DE-A 3,002,287.

WORKING EXAMPLE

A mordanting layer, a light-reflecting opaque layer and a photosensitive silver halide emulsion layer were applied in the following sequence to a transparent layer support of cellulose triacetate.

MORDANTING LAYER 3.75 g of a copolymer of one part of styrene and one part of maleic acid imide of N,N-dimethyl-N-hexadecyl-N-ω-aminopropyl-ammonium bromide were dissolved in 15 ml of ethanol, and this solution was stirred into 75 ml of a 5% gelatin solution and homogenized. After adding 2.6 ml of 5% saponin solution and 1 ml of 2% aqueous mucochloric acid solution, the mixture was adjusted to a conventional casting viscosity (about 11 mPa.s) and the solution was applied to the layer support by the dip process at 40° C.

LIGHT-REFLECTING LAYER

A suspension of 42 g of $TiO_2$ in 20 ml of water was dispersed in 150 ml of an 8% aqueous gelatin solution while adding 5 ml of 5% aqueous solution of sodium dodecyl benzene sulfonate and 5 ml of 5% aqueous saponin solution. After adding 1 ml of 2% mucochloric acid solution, the dispersion was adjusted to a viscosity of 13 mPa.s at 40° C., and applied to the dried mordanting layer by the dip process.

PHOTOSENSITIVE LAYER 1 mmol of CR compound 2 and 1.5 mmol of ED compound 6 were dissolved in
5 ml of acetic acid ethyl ester, and after adding
2 ml of palmitic acid diethylamide, were emulsified into
25 ml of 5% gelatin solution, with the addition of
5 ml of 5% aqueous solution of sodium dodecylbenzene sulfonate,
in a homogenizer at about 1000 r.p.m.

The emulsion was filtered over a folded filter and was made up to 75 ml with 5% gelatin solution.

After adding 1 ml of 2% mucochloric acid solution, the emulsion was mixed with 32 g of a ready-for-casting silver bromide gelatin emulsion having a proportion of 0.67 mol % of AgI. This emulsion was produced with 74 g of $AgNO_3$/kg of emulsion.

The silver/gelatin ratio was 1:1.1. The mixtures were applied to the light-reflecting layer of the dip process at a rate of 5 m/min at about 40° C. After drying for 24 hours, different samples were exposed on the emulsion side through a grey step filter, and were developed at 18° C. with a developer paste of the composition described in the following which was applied in a thickness of about 300 μm, were stopped for two minutes in a 5% acetic acid solution, then briefly rinsed and dried. For a first sample, the developing time was 1 minute and, for a second sample, it was 4 minutes.

DEVELOPER 20 g of carbethoxymethyl cellulose were dissolved with stirring in 800 ml of water. 40 g of solid NaOH, 1.5 g of ethylene diamine tetra-acetic acid-sodium salt, 11.5 g of borax, 1 g of sodium hexametaphosphate, 3 g of KBr, 1.6 g of 1-phenyl-4-methyl-4-hydroxymethyl-pyrazolidone-3 and 0.1 g of 1-phenyl-5-mercapto-tetrazole were added to the homogeneous solution. The solution was then made up to 1000 ml with water (pH 13.8). The pH falls in each case by 0.1 by adding each 5 ml of glacial acetic acid.

Magenta-colored positive color transfers of an adequate color density and a high color brilliance were obtained with both samples. Color transfer images were also produced according to the present invention in the same manner using other CR compounds. Color transfers of the same color density were also obtained using a test material which, before development had been stored in a heating chamber (3d, 57° C., 5% relative humidity) or in a tropical chamber (7d, 35° C., 85% relative humidity).

If dye-releasers of EP-A 0,035,685 are used instead of the dye-releasers according to the present invention, then color transfers of a comparable color desnity are indeed obtained after a development lasting four minutes, but the color density which is achieved after developing for one minute is only about half the density of that which is obtained after developing for four minutes. Moreover, when the dye-releasers according to the present invention are used to obtain sufficient color densities, a smaller quantity of ED compounds is required, compared to dye-releasers according to EP-A 0.035,685.

I claim:

1. In a photographic recording material comprising at least one photosensitive silver halide emulsion layer and a non-diffusing sulfilimine compound associated therewith which is capable of releasing a diffusible photographically active compound by reduction under photographic development conditions the improvement according to which the sulfilimine compound corresponds to the following formula I:

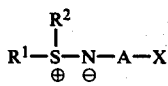

wherein
- R[1] and R[2] represents the same or different aryl radicals, at least one of which contains at least one electron-attracting group in the o- or p-position, and at least one of which contains a ballast group;
- A represents a linking member between N and X, consisting of a benzene ring which is directly joined to N at the 1-position, an electron-attracting group at the 2-position of the benzene ring and at least one other electron-attracting group at the 4- or 6-position of the benzene ring; and
- X represents an integrating radical which is released from the sulfilimine compound together with A and N as a diffusible photographically active compound corresponding to the formula $H_2N—A—X$.

2. A recording material as claimed in claim 1 wherein the sulfilimine compound corresponds to the following formula II:

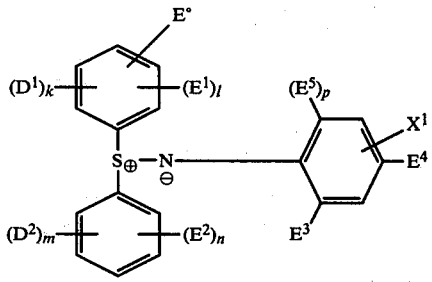

wherein
- E°, E[1], R[2] represent electron-attracting groups in the o- or p-position with regard to the sulfur atom,
- D[1], D[2] represent ballast groups,
- k,l,m,n,p each represent 0 or 1, provided that $k+m \geq 1$
- E[3], E[4], R[5] represent electron-attracting groups, and
- X[1] represents an integrating radical of a photographically active compound which is either directly bound to the benzene ring or is contained as a substituent either in E[4] or in E[5], and which is released from the sulfilimine compound together with N and the benzene ring as a diffusible photographically active compound corresponding to the formula:

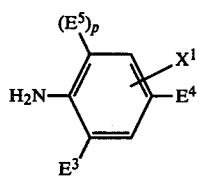

3. A recording material as claimed in claim 1 wherein a dye-releaser corresponding to the following formula III is used as the sulfilimine compound:

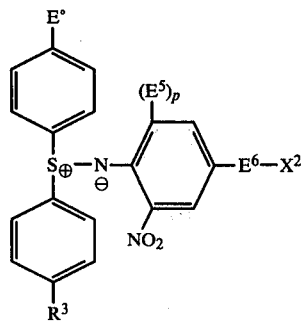

wherein
- E° represents —NO$_2$, alkylsulfonyl or sulfamoyl,
- R[3] represents hydrogen, halogen, alkyl, alkoxy, acylamino, carbamoyl or sulfamoyl, at least one of the radicals E° and R[3] containing a ballast radical,
- E[5] represents —NO$_2$, —CF$_3$, CN, alkylsulfonyl, sulfamoyl, carbalkoxy or carbamoyl,
- E[6] represents —CO—(R$^4$)$_q$— or —SO$_2$—(R$^4$)$_q$—,
- R[4] represents alkylene having up to 4 carbon atoms,
- p, q represent 0 or 1, and
- X[2] represents a radical of a dye or a dye precursor.

4. A recording material as claimed in claim 1 wherein the silver halide emulsion layer contains a negatively operating silver halide emulsion, and an electron donor compound or an electron donor precursor compound is contained in effective contact with the non-diffusing sulfilimine compound.

5. A recording material as claimed in claim 4 wherein a benzofuranone derivative corresponding to the following general formula is contained as an electron-donor-precursor compound:

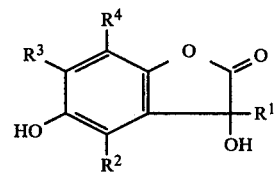

wherein:
- R[1] represents a carbocyclic or heterocyclic aromatic radical;
- R[2], R[3], R[4] represent the same or different substituents, that is hydrogen, alkyl, alkenyl, aryl, alkoxy, alkylthio, amino or R[3] and R[4] together complete a condensed carbocyclic ring, and at least one of the substituents R[1], R[2], R[3] and R[4] contains a ballast radical having from 10 to 22 carbon atoms which confers diffusion resistance.

6. A recording material as claimed in claim 1 which is composed as an integral instant color image unit and contains in the sequence given at least:
- (a) a photosensitive element comprising at least one photosensitive negative silver halide emulsion layer and a non-diffusing reducible color-providing sulfilimine compound within formula I of claim 1 associated therewith;
- (b) an alkali-permeable light-reflecting layer; and
- (c) an image-receiving layer.

* * * * *